United States Patent
Back et al.

(10) Patent No.: US 10,443,664 B2
(45) Date of Patent: Oct. 15, 2019

(54) SYNCHRONIZATION DEVICE AND SYNCHRONIZATION METHOD

(71) Applicant: Hoerbiger Antriebstechnik Holding GmbH, Schongau (DE)

(72) Inventors: Ottmar Back, Weilheim (DE); Ansgar Damm, Kinsau (DE)

(73) Assignee: HOERBIGER ANTRIEBSTECHNIK HOLDING GMBH, Schongau (DE)

( * ) Notice: Subject to any disclaimer, the term of this patent is extended or adjusted under 35 U.S.C. 154(b) by 16 days.

(21) Appl. No.: 15/307,029

(22) PCT Filed: May 11, 2015

(86) PCT No.: PCT/EP2015/060302
§ 371 (c)(1),
(2) Date: Oct. 27, 2016

(87) PCT Pub. No.: WO2015/180949
PCT Pub. Date: Dec. 3, 2015

(65) Prior Publication Data
US 2017/0045095 A1 Feb. 16, 2017

(30) Foreign Application Priority Data
May 26, 2014 (DE) .................. 10 2014 107 371

(51) Int. Cl.
*F16D 23/06* (2006.01)
*F16D 23/02* (2006.01)
(Continued)

(52) U.S. Cl.
CPC ........... *F16D 23/06* (2013.01); *F16D 23/025* (2013.01); *F16D 23/14* (2013.01); *F16H 63/30* (2013.01);
(Continued)

(58) Field of Classification Search
CPC ........ F16D 23/06; F16D 23/025; F16D 23/14; F16D 2023/0656; F16D 2023/3093; F16H 3/30
See application file for complete search history.

(56) References Cited

U.S. PATENT DOCUMENTS 4,280,370 A * 7/1981 Schreiner ............... F16D 23/06
192/53.3
5,507,376 A * 4/1996 Skotnicki ............... F16D 23/06
192/48.91
(Continued)

FOREIGN PATENT DOCUMENTS

CN 102434598 A 5/2012
DE 69924435 T2 4/2006
(Continued)

OTHER PUBLICATIONS

German Search Report dated Feb. 27, 2015 from corresponding DE Application No. 102014107371.1, along with partial English translation, 8 pages.
(Continued)

*Primary Examiner* — Tinh T Dang
(74) *Attorney, Agent, or Firm* — Dilworth IP, LLC (57) ABSTRACT

A synchronizing device for a transmission has a sliding sleeve comprising an internal toothing with a plurality of sliding sleeve teeth and a clutch body of a gear wheel, comprising n external toothing with a plurality of clutch body teeth formed without meshing bevel at their axial tooth end close to the sliding teeth, into which the internal toothing of the sliding sleeve can engage. A synchronizing unit is provided which can block axial movement of the sliding sleeve, until the speeds of the sliding sleeve and clutch body are adapted. During operation, an axial force of the sliding sleeve against the clutch body is built up and a speed difference between the sliding sleeve and the clutch (Continued)

body is produced, so that the end faces of the sliding sleeve teeth and the clutch body teeth slide along each other, and the sliding sleeve teeth finally are meshed between the clutch body teeth.

15 Claims, 8 Drawing Sheets

(51) Int. Cl.
  *F16D 23/14* (2006.01)
  *F16H 63/30* (2006.01)
(52) U.S. Cl.
  CPC .............. *F16D 2023/0656* (2013.01); *F16H 2063/3093* (2013.01)

(56) References Cited

U.S. PATENT DOCUMENTS

| | | | | |
|---|---|---|---|---|
| 5,547,057 | A * | 8/1996 | Sperber | F16D 23/06 192/53.34 |
| 6,467,598 | B2 * | 10/2002 | Jackson | F16D 23/06 192/53.34 |
| 6,581,488 | B2 * | 6/2003 | Miyazaki | F16H 61/12 74/335 |
| 6,729,458 | B2 * | 5/2004 | Blechschmidt | F16D 23/06 192/108 |
| 6,792,821 | B1 * | 9/2004 | Yamamoto | F16H 61/32 335/256 |
| 6,883,394 | B2 * | 4/2005 | Koenig | F16H 61/2807 74/330 |
| 7,156,771 | B2 | 1/2007 | Teraoka | |
| 7,163,093 | B2 * | 1/2007 | Miyamoto | F16D 23/06 192/108 |
| 7,203,586 | B2 * | 4/2007 | Shimojo | F16H 61/2807 477/107 |
| 7,533,592 | B2 * | 5/2009 | Hashimoto | F16D 23/06 192/53.34 |
| 8,162,118 | B2 * | 4/2012 | Marchie | F16D 23/06 192/108 |
| 8,251,848 | B2 * | 8/2012 | Murakami | F16H 3/728 475/5 |
| 10,190,678 | B2 * | 1/2019 | Nakamura | F16H 61/0213 |

FOREIGN PATENT DOCUMENTS

| | | | | |
|---|---|---|---|---|
| DE | 102005027772 | A1 | | 12/2006 |
| DE | 102012014830 | A1 | | 1/2014 |
| DE | 102012216419 | A1 * | 3/2014 | ............. F16D 23/04 |
| EP | 0976942 | B1 | | 3/2005 |
| JP | S58-58137 | U | | 4/1983 |
| JP | H11-82710 | A | | 3/1999 |
| JP | 2005-59791 | A | | 3/2005 |
| JP | 2005-155672 | A | | 6/2005 |
| JP | 2010-096190 | A | | 4/2010 |
| JP | 2014-77539 | A | | 5/2014 |

OTHER PUBLICATIONS

PCT International Search Report and Written Opinion dated Oct. 15, 2015 from corresponding Application No. PCTEP2015/060302, 14 pages.

* cited by examiner

Fig. 1
State of the Art

Fig. 2
State of the Art

Fig. 3
State of the Art

SYNCHRONIZATION DEVICE AND SYNCHRONIZATION METHOD

This invention relates to a synchronizing device and a synchronization method for a transmission.

BACKGROUND OF THE INVENTION

Locking synchronizers for transmissions normally are provided with a locking geometry for locking the sliding sleeve, as long as a speed differential exists between the sliding sleeve and the clutch body of the gear wheel to be shifted. To facilitate slipping in of the sliding sleeve into the clutch toothing of the clutch body, a meshing geometry normally is provided, which in general is realized by pointing both of the sliding sleeve teeth and of the clutch body teeth.

In modern automated transmissions, in particular in dual clutch transmissions, efforts are made to reduce the overall axial length.

It therefore is the object of the invention to create a synchronizing device for a transmission, which has a rather small overall axial length.

SUMMARY OF THE INVENTION

According to the invention this is achieved with a synchronizing device for a transmission, which includes a sliding sleeve which has an internal toothing with a plurality of sliding sleeve teeth, and which has a clutch body of a gear wheel which has an external toothing with a plurality of clutch body teeth into which the internal toothing of the sliding sleeve can engage. There is also provided a synchronizing unit which can block an axial movement of the sliding sleeve, wherein the clutch body teeth are formed without meshing bevel at their axial end close to the sliding sleeve teeth. According to the invention the pointing and the meshing geometry hence is omitted completely at least at the toothing of the clutch body. The overall axial length otherwise to be used for the meshing geometry with its inclined surfaces and the pointing of the tooth ends thereby is saved.

The tooth end of the clutch body teeth for example can be formed approximately cuboid.

In particular, the end faces of the clutch body teeth can extend substantially flatly and vertically to the axial direction.

It is possible to minimally round off or bevel the corners and edges of the tooth ends to increase the wear resistance, but not to such an extent that they would have a conventional function as meshing aid.

Known meshing bevels which are used as meshing aid are formed with a relatively small angle to the axial direction, in order to achieve the best possible conversion of an axial force into a circumferential movement. In the case of a symmetrical formation of the meshing bevels angles of about 30-60° mostly are used, whereas in an asymmetrical design angles smaller than 30° also are used. Meshing bevels in a top view mostly also extend over a large portion of the end face of a tooth, often over about 30 to 50% of the surface.

In contrast thereto, the end faces of the clutch teeth according to the invention preferably are formed flat over at least 60% of their surface or possibly slightly curved, with an angle of more than about 60° with respect to the axial direction.

Preferably, the tooth ends of the sliding sleeve teeth also are formed as flat as possible and without inclined surfaces which serve as meshing aid. For example, a tooth end of each of the sliding sleeve teeth can have an end face which extends substantially flatly and vertically to the axial direction. The end face for example amounts to at least 50% of the cross-sectional area of the sliding sleeve tooth as seen in axial direction. In this case, too, it is of course possible to each round off or slightly bevel corners and edges, for example to counteract wear, but no meshing aids must be provided.

It hence is possible to form both the clutch body teeth and the sliding sleeve teeth without meshing aids, in particular without meshing bevels and pointings. The sliding sleeve teeth and the clutch body teeth can be formed as claws.

In principle, the tooth ends of sliding sleeve teeth and clutch body teeth can be formed in the manner of a claw clutch. Claw clutches presently are not used in passenger car transmissions, as the speed difference present on shifting leads to noise problems and shocks during load change. According to the invention, this problem can be eliminated by providing the synchronizing unit which blocks the axial movement of the sliding sleeve, until a speed adaptation has occurred.

For the purpose of synchronization, at least some of the sliding sleeve teeth on one side of the tooth end preferably have a beveled blocking surface, which proceeds from the end face. In a preferred embodiment each sliding sleeve tooth has exactly one blocking surface, wherein the blocking surface each is formed only on one side of the sliding sleeve tooth.

The synchronizing unit can comprise a synchronizer ring which has an external toothing with synchronizer ring teeth whose arrangement is adjusted to the arrangement of the blocking surfaces. During the synchronization, the blocking surfaces of the sliding sleeve teeth meet with the synchronizer ring teeth during the axial displacement of the sliding sleeve, which synchronizer ring teeth block a further axial movement of the sliding sleeve, until a speed adaptation is achieved. By the blocking surfaces sliding on inclined surfaces of the synchronizer ring teeth, the synchronizer ring can then be set back and the sliding sleeve can be meshed into the clutch body.

Preferably, the blocking surfaces on adjacent sliding sleeve teeth are formed on different sides of the sliding sleeve tooth. This results in a geometry in which at the tooth ends in every second meshing lane formed between two sliding sleeve teeth the tooth walls forming the meshing lane extend substantially in axial direction. In the respectively adjacent meshing lane, the sides of the tooth ends of the sliding sleeve teeth facing each other each have a beveled blocking surface, which blocking surfaces are inclined against each other and during a gear change up or down get in contact with the synchronizer ring teeth.

The width of the meshing lane advantageously is adjusted to the width of the tooth ends of the clutch body teeth such that the same can be received between the sliding sleeve teeth without clearance as far as possible. The clearance-free receipt starts directly on meshing of the clutch body teeth between the sliding sleeve teeth.

In one possible embodiment, the end face of the clutch body teeth serves as end stop of the shifting movement and gets in contact with shoulders formed on the sliding sleeve teeth, in order to limit the shifting path of the sliding sleeve.

The shoulders for example can be formed on opposite sides of two sliding sleeve teeth, in particular each on the side of the sliding sleeve tooth opposite to the blocking surface. The shoulders are placed away from the end face of the sliding sleeve teeth by the desired maximum meshing path as in seen in axial direction.

Preferably, all clutch body teeth each are formed with the same length in axial direction. In particular, all clutch body teeth can be formed identical.

Alternatively or in addition, all sliding sleeve teeth also can be formed with the same length in axial direction.

In a further possible embodiment the tooth ends of some sliding sleeve teeth are formed with an end face which in axial direction protrudes beyond an end face of intermediate sliding sleeve teeth. The protruding tooth ends serve as catching claws which simplify meshing of the sliding sleeve. The end faces protruding in axial direction preferably are aligned substantially vertically to the axial direction.

According to another possible embodiment the end faces of the clutch body teeth are aligned inclined at an angle of about 80-89° with respect to the axial direction.

It is possible to form the synchronizing unit such that blocking of the axial movement of the sliding sleeve is eliminated upon exceedance of a predetermined maximum force. In such a formation, in contrast to conventionally known synchronizing units, a force-controlled coupling of the sliding sleeve into the clutch body becomes possible, even if the speed adaptation by the synchronizing unit is not terminated yet. Upon exceedance of the maximum fore, the synchronizer ring for example can be shifted against a spring action, in order to allow a further movement of the sliding sleeve in axial direction.

It also is the object of the invention to optimize a shifting operation by means of a synchronizing device as described above.

According to the invention this is achieved in that a speed of the sliding sleeve and a speed of the clutch body are adapted, an axial force of the sliding sleeve against the clutch body is built up, a speed difference between the sliding sleeve and the clutch body is produced, so that the end faces of the sliding sleeve teeth and the clutch body teeth slide along each other and the sliding sleeve teeth are meshed between the clutch body teeth.

A small speed difference between the sliding sleeve and the clutch body for example can be built up by unblocking after synchronizing and/or by an existing drag torque, before the teeth meet with each other.

Initially, the speed hence is adapted between sliding sleeve and clutch body by a synchronization. When applying the axial force, a meshing attempt advantageously is made directly. However, when the end faces of the sliding sleeve teeth do not lie on the gaps of the clutch body teeth, meshing is prevented by the flat end faces meeting with each other. In this case, the build-up of a small speed difference is allowed or actively promoted, which effects a relative rotation of the sliding sleeve teeth along the clutch body teeth. In this way, the proper alignment easily enables meshing of the sliding sleeve teeth into the clutch body teeth without significant development of noise. The disadvantage of a shifting operation with a pure claw clutch is eliminated by the synchronization and the speed adaptation.

Producing the speed difference for example can be effected by utilizing a drag torque of the transmission or the clutch, a relaxation of the drive train or also by a specific, in particular active actuation of a clutch. A slight speed difference already is sufficient, as it merely must effect a relative rotation substantially by one tooth width of a sliding sleeve tooth or clutch body tooth, until successful meshing is possible.

The meshing operation can be monitored by a control unit which in the case of an unsuccessful meshing attempt prompts a further meshing attempt after a predetermined time interval. The control unit also can monitor and/or control the applied axial force, so as not to prevent e.g. the build-up of a relative rotational speed between sliding sleeve and clutch body by the end faces of sliding sleeve teeth and clutch body teeth being pressed on each other too much.

BRIEF DESCRIPTION OF THE DRAWINGS

The invention will be described in detail below by means of several exemplary embodiments and with reference to the attached drawings, in which.

DETAILED DESCRIPTION OF THE INVENTION

Figure 1:
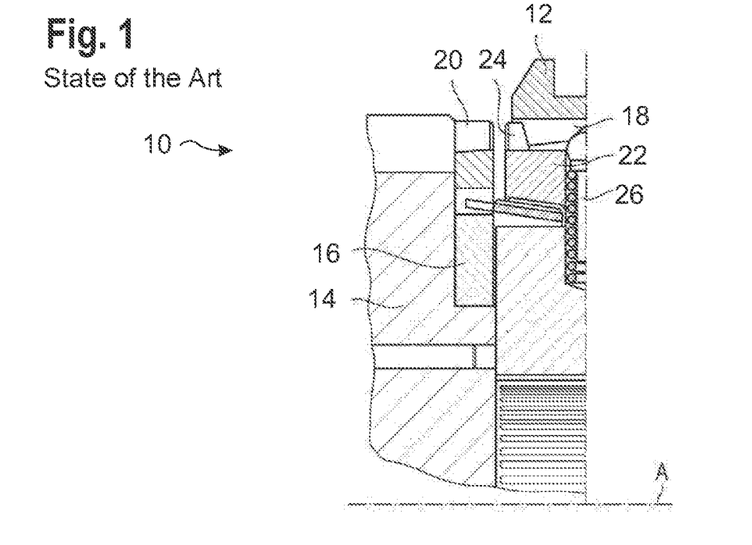
FIG. 1 shows a schematic sectional view of a conventional synchronizing device of a transmission.
Figure 2:
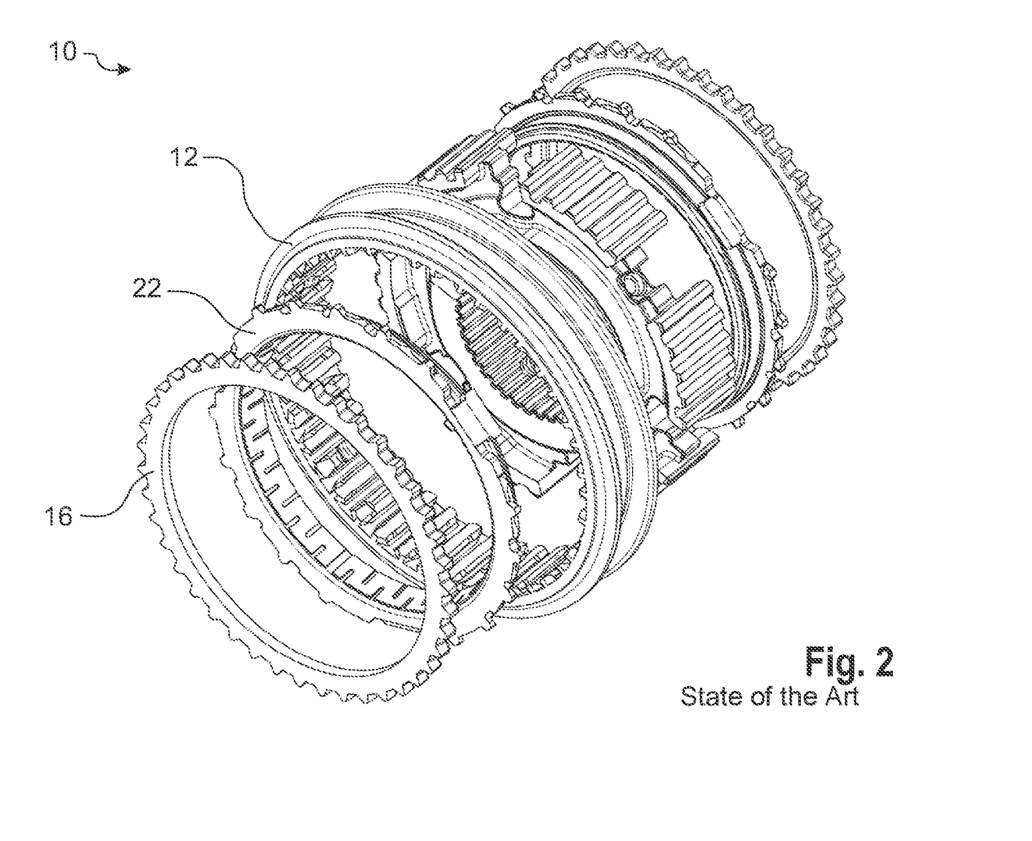
FIG. 2 shows a schematic perspective view of a conventional synchronizing device.
Figure 3:
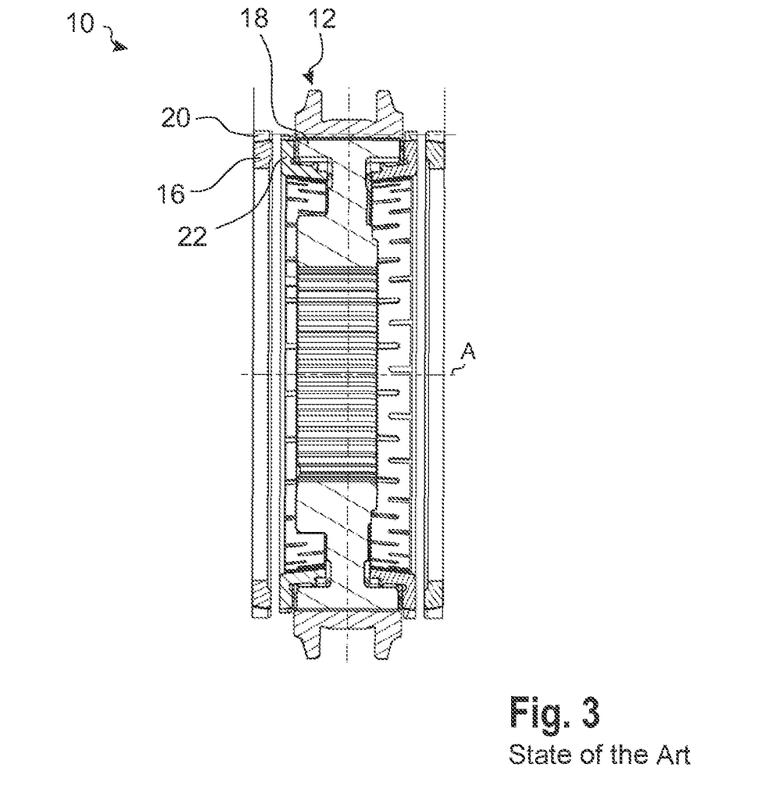
FIG. 3 shows a schematic sectional view of a conventional synchronizing device of a transmission.

FIGS. 1 to 3 show a known synchronizing device 10 of a transmission, comprising a sliding sleeve 12 shiftable in axial direction A, which non-rotatably rotates with a non-illustrated shaft, and a clutch body 16 firmly connected with a gear wheel 14. The gear wheel 14 is mounted on the shaft as idler gear and is non-rotatably connected with said shaft via the sliding sleeve 12.

The sliding sleeve 12 has an internal toothing with sliding sleeve teeth 18, while the clutch body 16 has an external toothing with clutch body teeth 20.

For carrying out a speed synchronization and a subsequent meshing operation in which the sliding sleeve teeth 18 are meshed into the spaces between the clutch body teeth 20, a synchronizing unit is provided, which in a known way includes a synchronizer ring 22 with an external toothing with synchronizer ring teeth 24. A ball spring-loaded in radial direction serves as pre-synchronizing unit 26.

The mode of operation of such synchronizing device 10, for example according to the Borg-Warner system, is well known. At the beginning of the axial movement of the sliding sleeve 12 the pre-synchronizing unit 26 exerts a force on the synchronizer ring 22 in axial direction A, wherein the synchronizer ring 22 gets in contact with a friction surface on the clutch body 16 and the synchronizer ring 22 thus is shifted in circumferential direction in the case of a speed difference. The locking teeth of the synchronizer ring 22 and the sliding sleeve 12 thereby are positioned relative to each other in circumferential direction, so that the teeth are blocked for the subsequently occurring adaptation of the speeds. During the adaptation of the speeds in the synchronizing operation, the synchronizer ring teeth 24 block the sliding sleeve 12, so that meshing of the sliding sleeve teeth 18 between the clutch body teeth 20 is prevented. Only when the speeds are adapted can the synchronizer ring 22 be set back and provides for meshing into the clutch body toothing.

FIGS. 4 to 8 show a synchronizing device 100 according to a first embodiment.

Figure 4:
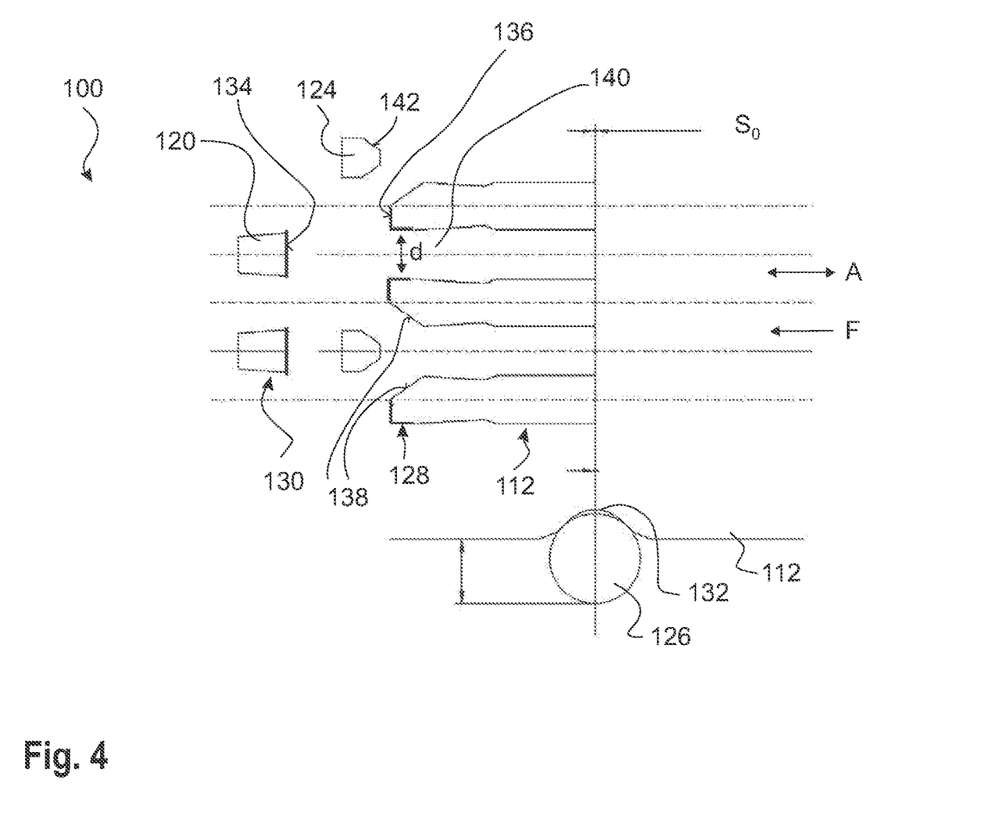
FIGS. 4 to 7 show the schematic representation of a meshing operation in a synchronizing device according to the invention.

FIG. 4 shows the condition before commencement of the shifting operation. The tooth ends 128 of the teeth 118 of the sliding sleeve 112 are spaced both from the synchronizer ring teeth 124 and from the tooth ends 130 of the clutch body teeth 120.

Like in the conventional synchronizing device 10, the sliding sleeve 112 rotates with the shaft, while the gear wheel to which the clutch body is attached loosely rotates with the same. The ball of the pre-synchronizing unit 126 engages into a groove 132 on the inside of the sliding sleeve 112, as this is indicated in FIG. 2 in the bottom right area.

According to the invention, the end faces 134 of all clutch body teeth 120 are formed substantially flat and extend vertically to the axial direction A. Hence there is provided no meshing bevel, i.e. pointing or bevel as meshing aid. The end faces 134 either can be formed completely flat or e.g. be slightly rounded radially to the outside or be crowned, wherein lateral edges and corners can be rounded off or beveled within the manufacturing tolerances, e.g. with a radius of 0.5 mm. All clutch body teeth 120 here have the same length and generally can be of identical shape.

The end faces 136 of all sliding sleeve teeth 118 likewise are formed substantially flat and extend vertically to the axial direction A. In a top view of the tooth end 128, the end face 136 here covers about half of the cross-sectional area vertically to the axial direction A.

The end face 136 like the end face 134 of the clutch body teeth 120 also can be formed completely flat or slightly rounded off radially to the outside or be crowned, wherein here as well the corners and edges can be formed slightly beveled or rounded off.

In this embodiment, all sliding sleeve teeth 118 have the same length.

On one side each of the sliding sleeve tooth 118 a beveled blocking surface 138 is formed, which proceeds from the end face 136. The end face 136, however, covers at least 50% of the total area of the cross-sectional area of the sliding sleeve tooth 118.

The blocking surfaces 138 each are formed on sides of the sliding sleeve teeth 118 facing each other. In this way, a meshing lane 140 alternately is formed between two adjacent sliding sleeve teeth 118 at the tooth ends 128, or two blocking surfaces 138 directed towards each other are provided at the tooth ends 128.

The width d of the meshing lane 140, i.e. the distance of the side faces of the sliding sleeve teeth 118 in the region of the tooth end 128, is adjusted to the diameter of the end face 134 of the clutch body teeth 120 and here is chosen only slightly larger than the same, so that in the meshed condition (see FIGS. 5 and 6) as little clearance as possible exists between the clutch body teeth 120 and the adjacent sliding sleeve teeth 118.

In the condition shown in FIG. 4, the shifting path $S_0$ covered by the sliding sleeve 112 still is equal to 0. When the sliding sleeve 112 is shifted in direction towards the clutch body by an axial force F in axial direction A, the pre-synchronizing unit 126 acts on the synchronizer ring 122 and presses the same onto the friction surface of the clutch body 116. The synchronizer ring 122 thereby is positioned in its blocking position. The sliding sleeve teeth 118 press onto the synchronizer ring teeth 124, and the speed adaptation is effected. When the speeds are adapted, a further axial advancement of the sliding sleeve 112 in direction of the clutch body 116 is possible. The sliding sleeve teeth 118 slide along in the spaces between the synchronizer ring teeth 124. This movement is supported by inclined surfaces 142 on both sides of the synchronizer ring teeth 124, which get in contact with the blocking surfaces 138 on the sliding sleeve teeth 118 and can slide along the same, in order to guide the synchronizer ring teeth 124 into the spaces between the sliding sleeve teeth 118.

Figure 5:
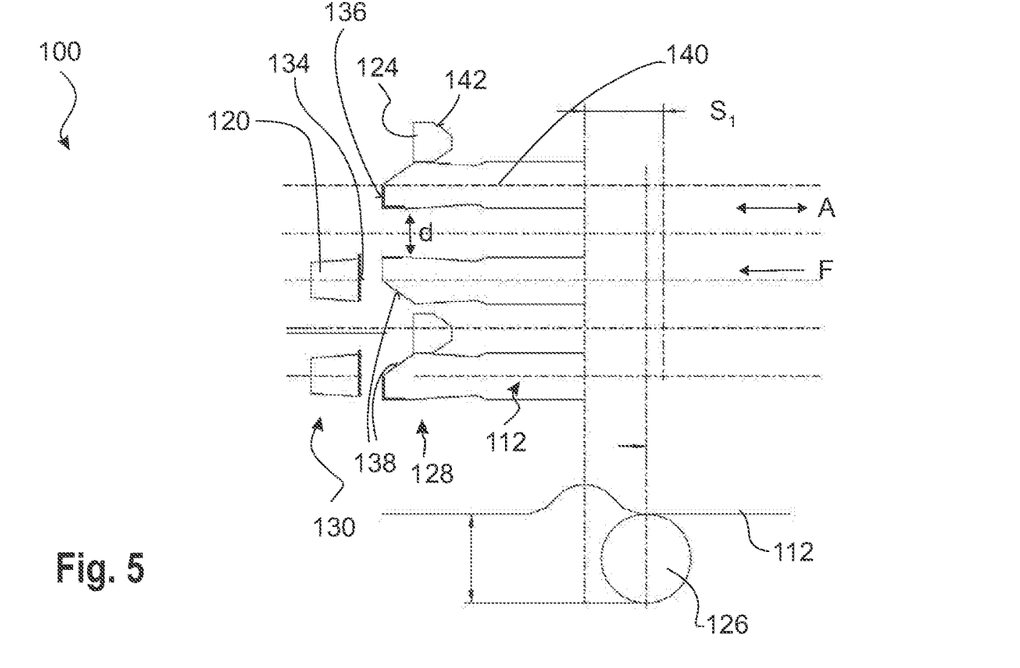

This condition is shown in FIG. 5. The sliding sleeve 112 has covered a first shifting path $S_1$. The groove 132 in the sliding sleeve 112 has slid over the ball of the pre-synchronizing unit 126 (each shown in the lower part of FIGS. 4 to 7).

In the example shown, the end faces 134, 136 of the clutch body and of the sliding sleeve 112 directly meet with each other, so that meshing of the clutch body teeth 120 into the meshing lanes 140 between the sliding sleeve teeth 118 is not possible.

In this case, a small speed difference between the clutch body and the sliding sleeve 112 must again be built up. The speed difference can be minimal, as there must merely be produced an offset in circumferential direction, which ensures that the end faces 134 of the clutch body teeth 120 meet with the meshing lanes 140 between the sliding sleeve teeth 118.

The speed difference can be achieved for example by simply waiting for a predetermined time interval, wherein for example the drag torque of the transmission or a relaxation of the drive can be utilized, which in the free-flight phase necessarily effect a speed difference when the contact between the synchronizer ring and the friction surface of the clutch body is eliminated. It is of course also possible to selectively actuate a clutch or provide a controller which generates the speed difference (not shown).

Figure 6:
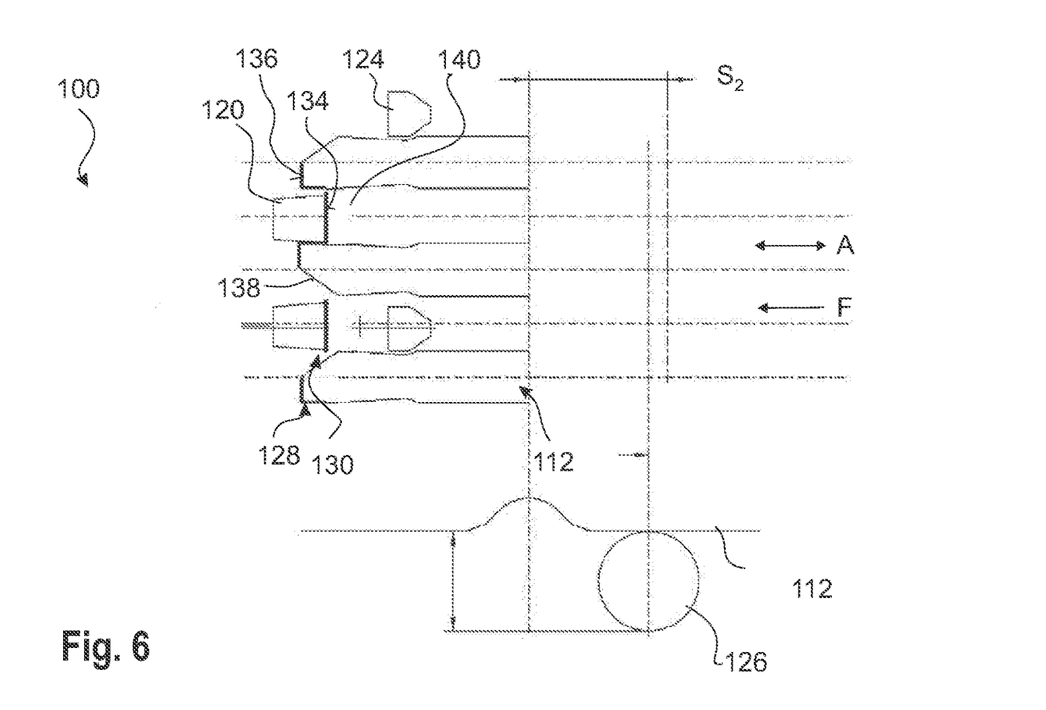

When the desired position is reached, as this is shown in FIG. 6, the sliding sleeve 112 can be pushed onto the clutch body 116 by further application of the axial force F, wherein the sliding sleeve teeth 118 are meshed between the clutch body teeth 120 and the end faces 134 of the clutch body teeth 120 come to lie between the sliding sleeve teeth 118. This meshing is effected at a shifting path of the sliding sleeve $S_2$.

Figure 7:
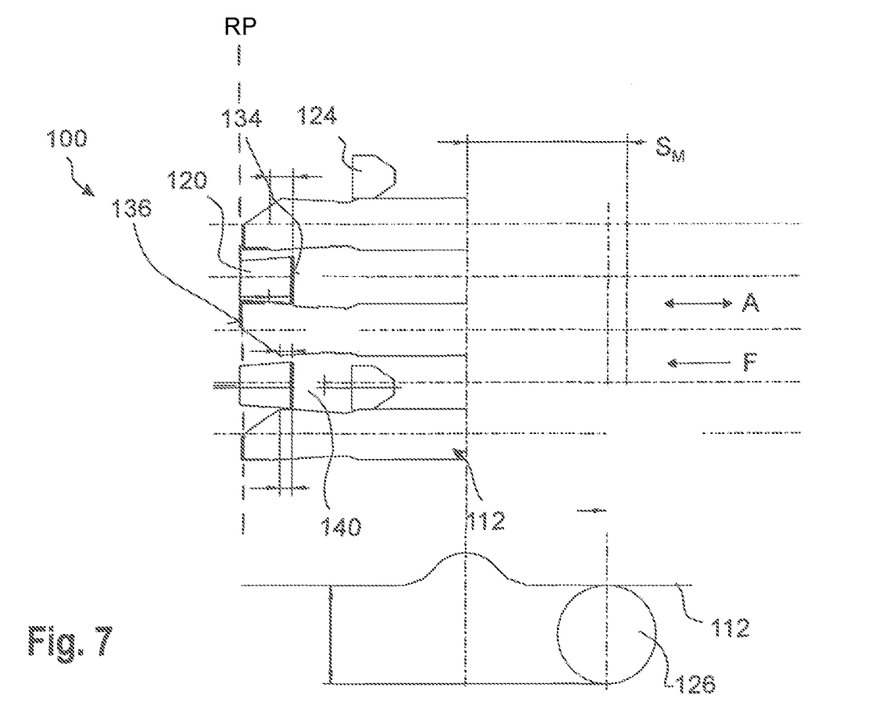
Figure 8:
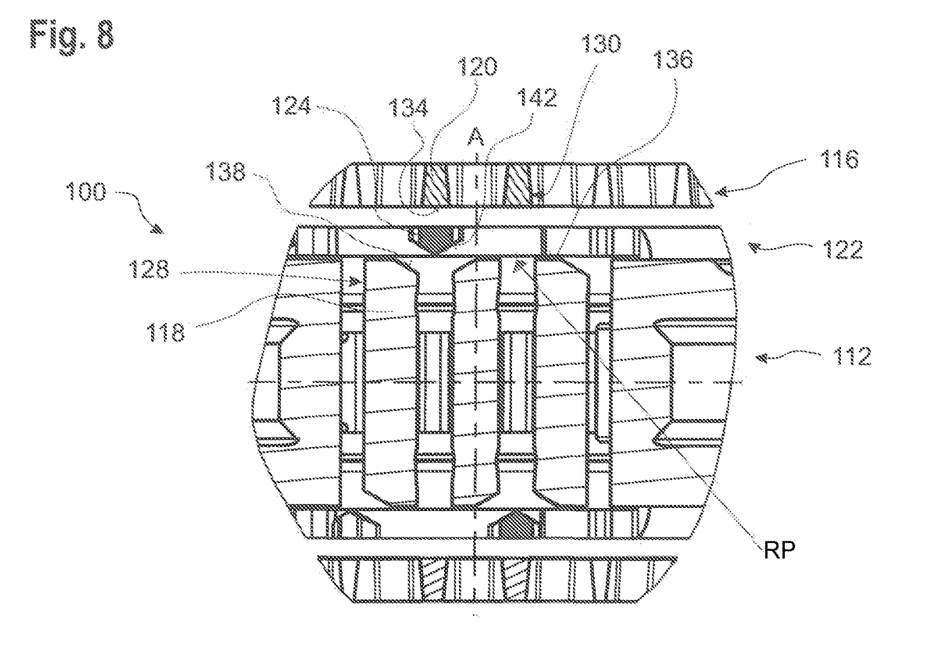
FIG. 8 shows a schematic representation of the synchronizing device of FIGS. 4 to 7.

In each of FIGS. 4-8, the sliding sleeve teeth 118 are all shown to be the same length and extend the same distance the axial direction. For example, as seen in FIGS. 7 and 8, for all sliding sleeve teeth 118, or tooth end face 136, the axial ends closest to the clutch body, end in a single radial plane RP.

The completely meshed condition is shown in FIG. 7, when the maximum shifting path $S_M$ has been covered. The clutch body teeth 120 now lie in their maximum insertion depth between the sliding sleeve teeth 118.

Figure 9:
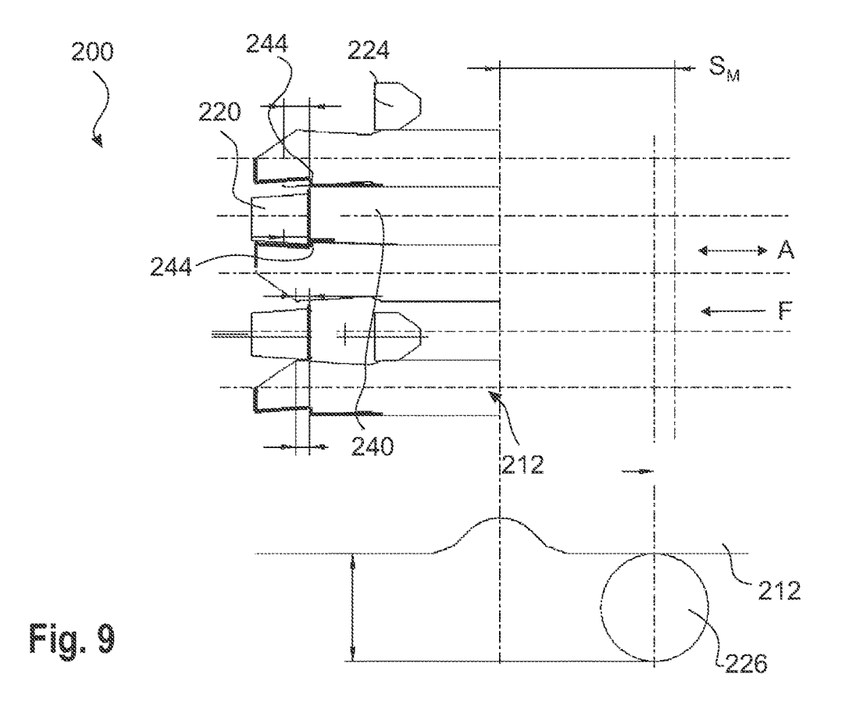
FIG. 9 shows a schematic representation of a synchronizing device according to the invention in a second embodiment in the completely meshed condition.

FIG. 9 shows a second embodiment of a synchronizing device 200, in which on each sliding sleeve tooth 218 on the side facing away from the blocking surface 138 a shoulder 244 is formed, which serves as stop surface for the end face 234 of the clutch body teeth 220 with maximum shifting path $S_M$. In this example, every second clutch body tooth 220 gets in contact with two shoulders 244 which support the same on opposite sides. The remaining configuration is identical to that of the first embodiment.

Reference numerals for components already known in principle from the previous embodiments each are increased by 100. This also applies for the further embodiments described in the following.

Figure 10:
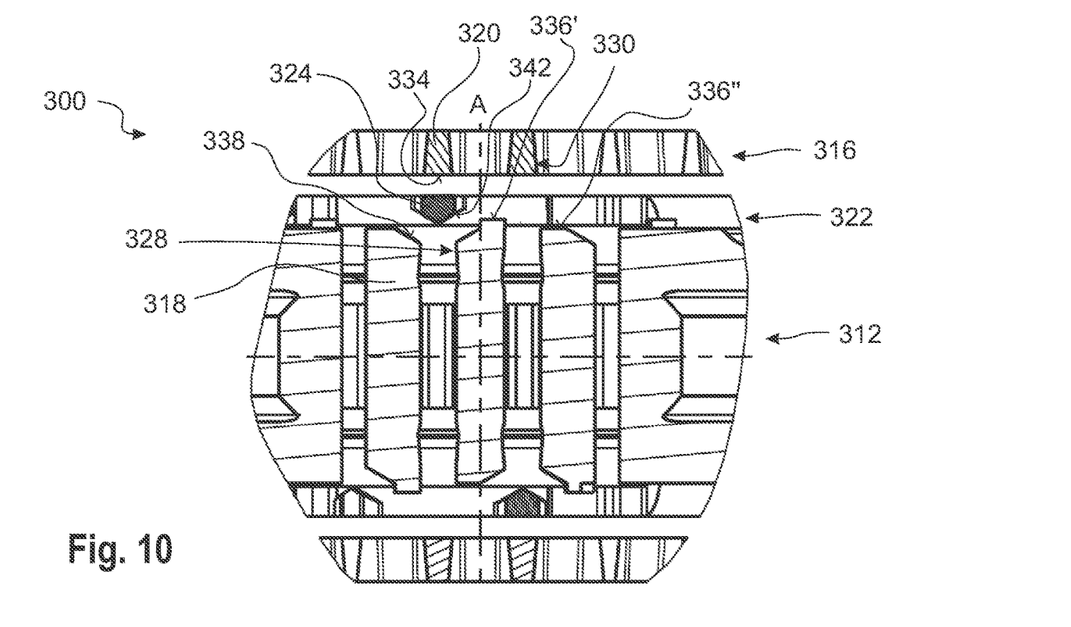
FIG. 10 shows a schematic representation of a synchronizing device according to the invention in a third embodiment before the synchronization.

FIG. 10 shows a third embodiment of a synchronizing device 300. In contrast to the first embodiment, the tooth ends 328 of every second sliding sleeve tooth 318 of the sliding sleeve 312 are formed with an end face 336' over about half of their cross-section, which in axial direction A protrudes beyond the end face 136" of the intermediate sliding sleeve teeth 318 by few millimeters. The end face 336' here extends substantially vertically to the axial direction A.

In this way, the protruding portion of the sliding sleeve tooth 318 forms a catching claw which simplifies meshing between the clutch body teeth 320 of the clutch body 316.

The blocking surfaces 338 at the sliding sleeve teeth 318 with the protruding end faces 136' start at the same axial height as the blocking surfaces 338 on the remaining sliding sleeve teeth 318.

The clutch body 316 and the synchronizer ring 322 are formed identical to the first embodiment.

Figure 11:
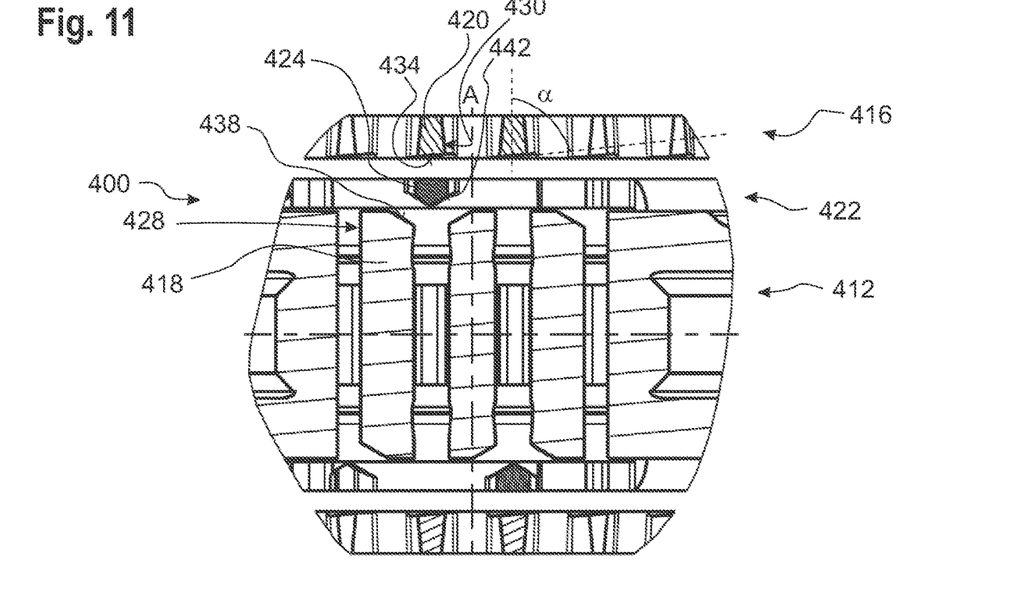
FIG. 11 shows a schematic representation of a synchronizing device according to the invention in a fourth embodiment before the synchronization.

FIG. 11 shows a fourth embodiment of a synchronizing device 400. The end face 434 of each of the clutch body teeth 420 here is formed flat, but aligned inclined at an angle α of about 80-89° with respect to the axial direction A. The angle α in particular is between 84-89°. In the example shown, all end faces 434 are inclined in the same direction with respect to the circumferential direction.

The sliding sleeve 412 and the synchronizer ring 422 here are formed like in the first embodiment.

Figure 12:
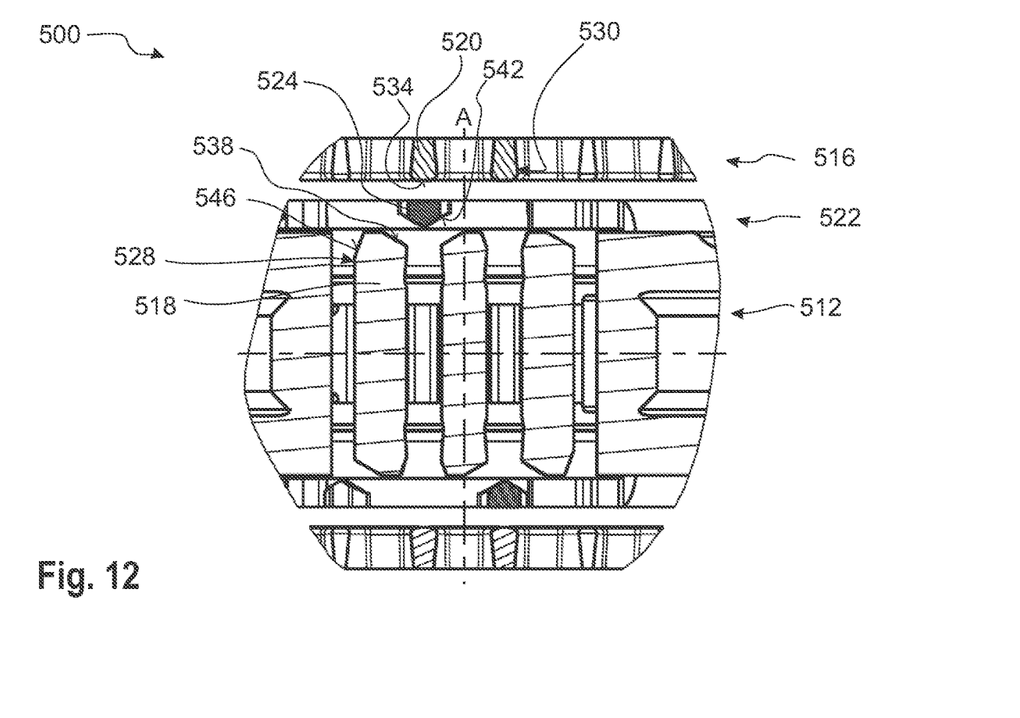
FIG. 12 shows a schematic representation of a synchronizing device according to the invention in a fifth embodiment before the synchronization.

FIG. 12 shows a fifth embodiment of a synchronizing device 500. Here, the end faces 534 of all clutch body teeth 520 are designed slightly crowned, so that their outer contour is rounded off and the end face 534 extends at least sectionally curved. The curvatures, however, remain at an angle of about 60° with respect to the axial direction A and do not serve as meshing aid, but merely to reduce wear.

The tooth ends 528 of the sliding sleeve teeth 518 here each have an inclined surface 546 on the side facing away from the blocking surface 538, which extends at a smaller angle to the axial direction than the blocking surface 538. Between the blocking surface 538 and the inclined surface 546 an end face 536 aligned vertically to the axial direction A is provided.

Figure 13:
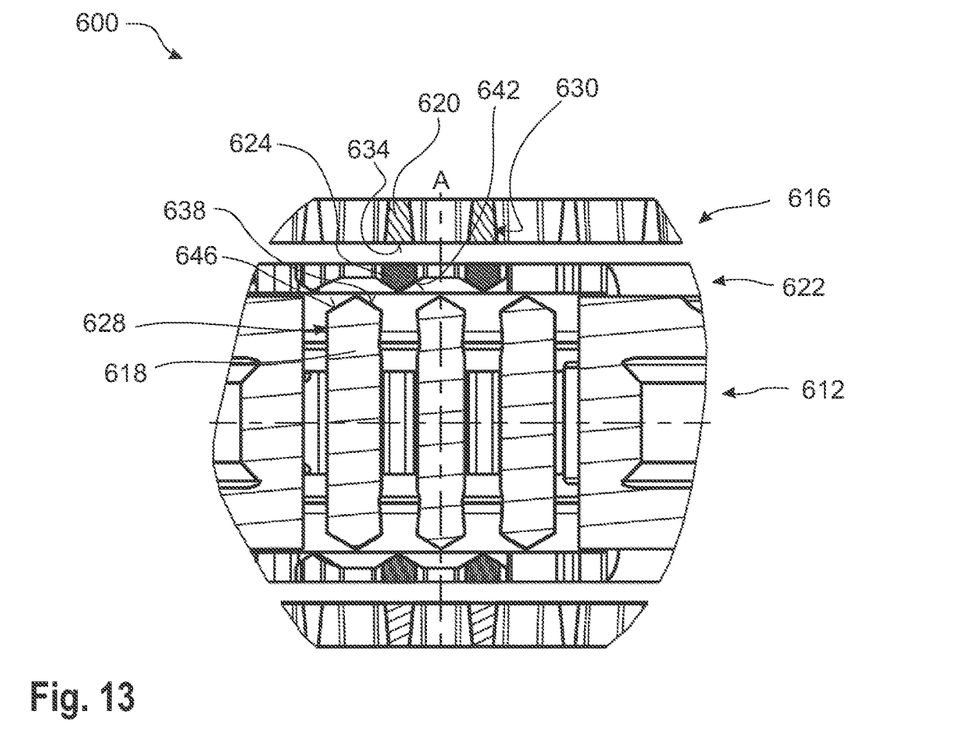
FIG. 13 shows a schematic representation of a synchronizing device according to the invention in a sixth embodiment before the synchronization.

FIG. 13 shows a sixth embodiment of a synchronizing device 600, in which the sliding sleeve teeth 618 are formed pointed. The inclined surfaces 646 directly adjoin the blocking surfaces 638. In this example, the angle of inclination of the inclined surfaces 646 is chosen approximately as large as that of the blocking surfaces 638.

The inclined surfaces 646 here likewise serve as blocking surfaces for the synchronizer ring 622, wherein the same is provided with twice the number of synchronizer ring teeth 624 as in the first embodiment.

The tooth ends 630 of the clutch body teeth 620 here are formed like in the first embodiment.

The features of the individual embodiments described can freely be combined with each other or be exchanged for each other at the discretion of the skilled person.

In the described synchronizing devices 100-600 the blocking function is separated from the meshing function. For blocking purposes, as is known conventionally, the blocking surfaces 138 between the sliding sleeve teeth 118-618 and the synchronizer ring teeth 124 are used. However, a meshing geometry with a pointing of the sliding sleeve teeth 118-418 largely is omitted, and a pointing of the clutch body teeth 120-620 at the clutch body 116-616 is omitted completely, and both the clutch body teeth 120-620 and the sliding sleeve teeth 118-518 can substantially be designed as claws.

In the case of an overlap which as compared to a conventional synchronizing device 10 remains the same in the shifted condition, the axial installation space thus can be reduced by about 2 mm. In typical transmission layouts this provides a reduction of the total transmission length of up to 8 mm.

The shifting path $S_M$ of the sliding sleeve 112-612 also is reduced by the axial installation space saved due to the pointing. Alternatively, a larger overlap of the toothings of sliding sleeve 112-612 and clutch body 116-616 might be achieved in this way with the axial installation space remaining the same.

The invention claimed is:

1. A synchronizing device for a transmission, comprising a sliding sleeve which includes an internal toothing with a plurality of sliding sleeve teeth having axial ends, wherein all sliding sleeve teeth have an origin in the same radial plane, and a clutch body of a gear wheel, which has an external toothing with a plurality of clutch body teeth into which the internal toothing of the sliding sleeve can engage, and a synchronizing unit which can block an axial movement of the sliding sleeve, wherein the clutch body teeth are formed without meshing bevel at their axial tooth end close to the sliding sleeve teeth and wherein for all of the sliding sleeve teeth, the axial ends closest to the clutch body end in a single radial plane, wherein, at the axial end closest to the clutch body, at least some of the sliding sleeve teeth have, on exactly one circumferentially facing side at a tooth end, a beveled blocking surface which proceeds from an end face extending in an axial direction, wherein the beveled blocking surfaces on adjacent sliding sleeve teeth are formed on different circumferentially facing sides of the sliding sleeve tooth.

2. The synchronizing device according to claim 1, characterized in that the sliding sleeve teeth and the clutch body teeth are formed as claws.

3. The synchronizing device for a transmission according to claim 1, wherein a tooth end of each of the sliding sleeve teeth has an end face which faces an axial direction (A), wherein the end face amounts to at least 50% of the cross-sectional area of the sliding sleeve tooth and wherein a tooth end of at least some of the sliding sleeve teeth have on one circumferentially facing side a beveled blocking surface which proceeds from the end face.

4. The synchronizing device according to claim 3, characterized in that the synchronizing unit comprises a synchronizer ring which has an external toothing with synchronizer ring teeth whose arrangement is adjusted to the arrangement of the blocking surfaces.

5. The synchronizing device according to claim 3, characterized in that the beveled blocking surfaces on adjacent sliding sleeve teeth are formed on different sides of the sliding sleeve tooth.

6. The synchronizing device according to claim 3, characterized in that the sliding sleeve teeth have a shoulder on the side opposite to the beveled blocking surface.

7. The synchronizing device according to claim 6, characterized in that the clutch body teeth have an end face that serves as end stop of the shifting movement and gets in contact with shoulders formed on the sliding sleeve toothing.

8. The synchronizing device according to claim 1, characterized in that the synchronizing unit is formed such that blocking of the axial movement of the sliding sleeve is eliminated upon exceedance of a predetermined maximum force.

9. The synchronizing device according to claim 1, characterized in that all clutch body teeth are formed identically.

10. The synchronizing device according to claim 1, characterized in that all clutch body teeth have the same length in axial direction (A).

11. The synchronizing device according to claim 1, characterized in that all sliding sleeve teeth have the same length in axial direction (A).

12. The synchronizing device according to claim 1, characterized in that tooth ends of some sliding sleeve teeth are formed with an end face which in axial direction (A) protrudes beyond an end face of intermediate sliding sleeve teeth.

13. The synchronizing device according to claim 1, characterized in that the clutch body teeth have an end face that are aligned inclined at an angle ($\alpha$) of 80-89° with respect to an axial direction (A).

14. A synchronizing device for a transmission, comprising a sliding sleeve which includes an internal toothing with a plurality of sliding sleeve teeth wherein all sliding sleeve teeth have an origin in the same radial plane, and a clutch body of a gear wheel, which has an external toothing with a plurality of clutch body teeth into which the internal toothing of the sliding sleeve can engage, and a synchronizing unit which can block an axial movement of the sliding sleeve, wherein the clutch body teeth are formed without meshing bevel at their axial tooth end close to the sliding sleeve teeth, wherein, at the axial end closest to the clutch body, at least some of the sliding sleeve teeth have, on exactly one circumferentially facing side at a tooth end, a beveled blocking surface which proceeds from an end face extending in an axial direction, wherein the beveled blocking surfaces on adjacent sliding sleeve teeth are formed on different circumferentially facing sides of the sliding sleeve tooth.

15. The synchronizing device according to claim 14, characterized in that the sliding sleeve teeth have a shoulder on the circumferentially facing side opposite to the beveled blocking surface.

* * * * *